(12) United States Patent
Karlsson

(10) Patent No.: US 10,679,258 B2
(45) Date of Patent: Jun. 9, 2020

(54) SYSTEMS AND METHODS FOR RESPONSE CURVE ESTIMATION FOR DISTRIBUTION OF DATA ELEMENTS ON AN ELECTRONIC NETWORK

(71) Applicant: Oath (Americas) Inc., Dulles, VA (US)

(72) Inventor: Niklas Karlsson, Mountain View, CA (US)

(73) Assignee: Verizon Media Inc., Dulles, VA (US)

( * ) Notice: Subject to any disclaimer, the term of this patent is extended or adjusted under 35 U.S.C. 154(b) by 0 days.

(21) Appl. No.: 16/384,548

(22) Filed: Apr. 15, 2019

(65) Prior Publication Data

US 2019/0244256 A1    Aug. 8, 2019

Related U.S. Application Data

(63) Continuation of application No. 14/275,758, filed on May 12, 2014, now Pat. No. 10,311,486.

(60) Provisional application No. 61/822,870, filed on May 13, 2013.

(51) Int. Cl.
*G06Q 30/02* (2012.01)
(52) U.S. Cl.
CPC .................. *G06Q 30/0275* (2013.01)
(58) Field of Classification Search
CPC ................................................ G06Q 30/0275
See application file for complete search history.

(56) References Cited

U.S. PATENT DOCUMENTS

| 6,990,462 B1 | 1/2006 | Wilcox et al. |
| 7,546,625 B1 | 6/2009 | Kamangar |
| 8,266,009 B1 * | 9/2012 | Devlin ................. G06Q 40/00 705/26.3 |
| 2001/0020236 A1 | 9/2001 | Cannon |
| 2002/0042738 A1 | 4/2002 | Srinivasan et al. |
| 2003/0074252 A1 | 4/2003 | Chandler-Pepelnjak et al. |

(Continued)

OTHER PUBLICATIONS

"A Search-based Method for Forecasting Ad Impression in Contextual Advertising", by Wang et al. WWW 2009 Madrid!. Search/Session: Ads and Query Expansion. pp. 491-499. Apr. 20, 2009. (Year: 2009).*

(Continued)

*Primary Examiner* — William A Brandenburg
(74) *Attorney, Agent, or Firm* — Bookoff McAndrews, PLLC

(57) ABSTRACT

Systems, methods, and computer-readable media are disclosed for calculating input-output relationships using, for example, spline functions. In accordance with one implementation, a computer-implemented method is provided that includes determining at least one price-volume point comprising a price and associated volume, transforming the price, and using the transformed price to calculate values along a spline function to obtain a price-volume curve weight factor. The method further includes transforming a second price, calculating values along the spline function and the first derivative of the spline function using the transformed second price to obtain a volume estimate and volume rate at the second price, and recalculating the spline function based on the calculated price-volume curve weight factor, volume estimate, volume estimate and volume rate.

20 Claims, 4 Drawing Sheets

(56) References Cited

U.S. PATENT DOCUMENTS

| | | |
|---|---|---|
| 2003/0171990 A1 | 9/2003 | Rao et al. |
| 2004/0088241 A1 | 5/2004 | Rebane et al. |
| 2005/0021403 A1 | 1/2005 | Ozer et al. |
| 2005/0097204 A1 | 5/2005 | Horowitz et al. |
| 2005/0171844 A1 | 8/2005 | Ferber et al. |
| 2005/0209953 A1 | 9/2005 | Stubbs et al. |
| 2006/0041480 A1 | 2/2006 | Briggs |
| 2006/0047703 A1 | 3/2006 | Strober et al. |
| 2006/0074749 A1 | 4/2006 | Kline et al. |
| 2006/0080171 A1 | 4/2006 | Jardins et al. |
| 2006/0184421 A1 | 8/2006 | Lipsky et al. |
| 2006/0206355 A1 | 9/2006 | Cheung et al. |
| 2006/0224445 A1 | 10/2006 | Axe et al. |
| 2006/0224498 A1 | 10/2006 | Chin |
| 2006/0230029 A1 | 10/2006 | Yan |
| 2006/0253319 A1 | 11/2006 | Chayes et al. |
| 2006/0280381 A1 | 12/2006 | Iwakiri |
| 2006/0282328 A1 | 12/2006 | Gerace et al. |
| 2006/0282533 A1 | 12/2006 | Steelberg et al. |
| 2007/0006145 A1 | 1/2007 | Hill et al. |
| 2007/0022005 A1 | 1/2007 | Hanna |
| 2007/0027761 A1 | 2/2007 | Collins et al. |
| 2007/0027771 A1 | 2/2007 | Collins et al. |
| 2007/0028263 A1 | 2/2007 | Collins |
| 2007/0033105 A1 | 2/2007 | Collins et al. |
| 2007/0038508 A1 | 2/2007 | Jain et al. |
| 2007/0067267 A1 | 3/2007 | Ives |
| 2007/0078707 A1 | 4/2007 | Axe et al. |
| 2007/0088605 A1 | 4/2007 | Ghate et al. |
| 2007/0124194 A1 | 5/2007 | Barnette et al. |
| 2007/0130004 A1 | 6/2007 | Borgs et al. |
| 2007/0130009 A1 | 6/2007 | Steelberg et al. |
| 2007/0130014 A1 | 6/2007 | Altberg et al. |
| 2007/0143186 A1 | 6/2007 | Apple et al. |
| 2007/0162296 A1 | 7/2007 | Altberg et al. |
| 2007/0174114 A1 | 7/2007 | Bigby et al. |
| 2007/0265923 A1 | 11/2007 | Krassner et al. |
| 2007/0283388 A1 | 12/2007 | Beccaro et al. |
| 2008/0021791 A1 | 1/2008 | Steelberg et al. |
| 2008/0027802 A1 | 1/2008 | Mendelevitch et al. |
| 2008/0052219 A1 | 2/2008 | Sandholm et al. |
| 2008/0065479 A1 | 3/2008 | Tomlin et al. |
| 2008/0097813 A1 | 4/2008 | Collins et al. |
| 2008/0100489 A1 | 5/2008 | Trifonov et al. |
| 2008/0103953 A1 | 5/2008 | Flake et al. |
| 2008/0126240 A1 | 5/2008 | Banbury et al. |
| 2008/0140524 A1 | 6/2008 | Anand et al. |
| 2008/0154707 A1 | 6/2008 | Mittal et al. |
| 2008/0162200 A1 | 7/2008 | O'Sullivan et al. |
| 2008/0195475 A1 | 8/2008 | Lambert et al. |
| 2008/0215418 A1 | 9/2008 | Kolve et al. |
| 2008/0249834 A1 | 10/2008 | Zigmond et al. |
| 2008/0249855 A1 | 10/2008 | Collins et al. |
| 2008/0255915 A1 | 10/2008 | Collins et al. |
| 2008/0255921 A1 | 10/2008 | Flake et al. |
| 2008/0262913 A1 | 10/2008 | Reitz |
| 2008/0270223 A1 | 10/2008 | Collins et al. |
| 2008/0275757 A1 | 11/2008 | Sharma et al. |
| 2008/0281627 A1 | 11/2008 | Chang et al. |
| 2009/0006145 A1 | 1/2009 | Duggal et al. |
| 2009/0037267 A1 | 2/2009 | Duggal et al. |
| 2009/0099904 A1 | 4/2009 | Affeld et al. |
| 2009/0157507 A1 | 6/2009 | Agius et al. |
| 2009/0210287 A1 | 8/2009 | Chickering et al. |
| 2009/0248513 A1 | 10/2009 | Aggarwal et al. |
| 2010/0094878 A1 | 4/2010 | Soroca et al. |
| 2010/0138291 A1 | 6/2010 | Silverman et al. |
| 2010/0262455 A1 | 10/2010 | Karlsson et al. |
| 2010/0262497 A1 | 10/2010 | Karlsson |
| 2010/0262499 A1 | 10/2010 | Karlsson et al. |
| 2011/0131099 A1 | 6/2011 | Shields et al. |
| 2011/0246267 A1 | 10/2011 | Williams et al. |
| 2011/0276411 A1 | 11/2011 | McElfresh et al. |
| 2012/0030011 A1 | 2/2012 | Rey et al. |
| 2012/0150656 A1 | 6/2012 | Karidi et al. |
| 2013/0197994 A1 | 8/2013 | Karlsson et al. |

OTHER PUBLICATIONS

"Bid Landscape Forecasting in Online Ad Exchange Marketplace", by Cui et al. Yahoo! Labs. pp. 1-9. Aug. 15, 2010. (Year: 2010).*

"Modeling On-Line Art Auction Dynamics Using Functional Data Analysis", Srinivas K. Reddy and Mayukh Dass. Statistical Science. 2006, vol. 21, No. 2, 179-193 (pages numbered 1-19 of provided PDF copy for the purpose of citing prior art teachings) (Year 2006).*

Google Analysis, "The value of Landing Pages," Aug. 31, 2009 (9 pages).

"Modeling On-Line Art Auction Dynamics Using Functional Data Analysis", Srinivas K Reddy and Mayukh, Dass. Statistical Science. 2006, vol. 21, No. 2, 179-193 (pages numbered 1-19 of provided PDF copy for the purposes of citing prior art teachings).

Chomsky: Ideas and Ideals, Neil Smith, Cambridge University Press, 1999, p. 12.

Fang et al, "On the Failure of the Linkage Principle with Financially Constrained Bidders: An Example" Dec. 13, 2000 (24 pages).

International Search Report and Written Opinion for PCT/US2013/022881, dated Mar. 29, 2013 (10 pages).

International Search Report and Written Opinion issued in PCT/US2010/030341 dated Oct. 4, 2010 (16 pages).

International Search Report and Written Opinion issued in PCT/US2010/030343 dated Oct. 7, 2010 (9 pages).

International Search Report and Written Opinion issued in PCT/US2010/030347 dated Oct. 8, 2010 (6 pages).

International Search Report and Written Opinion issued in PCT/US2014/057747 dated Apr. 13, 2015 (14 pages).

Internet Archive version of "9.6. random—Generate pseudo-random numbers", https://docs.python.org/3.1/library/random.html; Mar. 26, 2010 (15 pages).

Jiang et al, "Estimating Bidders Valuation Distribution in Online Auctions", University of British Columbia, 2005 (16 pages).

Office Action issued in U.S. Appl. No. 13/668,828 dated Mar. 23, 2016 (33 pages).

Search History for PCT Application No. PCT/US2013/022881, dated Mar. 13, 2013 (6 pages).

* cited by examiner

SYSTEMS AND METHODS FOR RESPONSE CURVE ESTIMATION FOR DISTRIBUTION OF DATA ELEMENTS ON AN ELECTRONIC NETWORK

RELATED APPLICATIONS

This application is a continuation of and claims the benefit of priority to U.S. application Ser. No. 14/275,758, filed May 12, 2014, which claims the benefit of priority to U.S. Provisional Patent Application No. 61/822,870, filed May 13, 2013, the entireties of which are incorporated herein by reference.

BACKGROUND

Technical Field

The present disclosure relates generally to computer-implemented systems, methods, and computer-readable media for response curve estimation. More particularly, and without limitation, the present disclosure includes embodiments for estimating response curves as spline functions, constructed from one or more polynomial segments subject to conditions or continuity at their joints. The curves may enable finer estimations of input-output functions, such as online advertising display functions.

Background

It is difficult to model real world systems using a formula involving only a few variables or parameters. This is because real-world systems generally operate on a less predictable scale than can be modeled by such a formula. One example of such a difficult-to-predict real-world system is an online advertising system that uses a market clearing process. In such a market clearing process, an advertiser with an advertisement (or "content promotion"), such as a banner advertisement, headline, or graphic, may independently bid on a particular placement on a web page, known as a "promotion spot" or "promotion slot." These content promotions may be associated, alone or as part of a set of content promotions, with one or more desired goals (e.g., a total number of impressions or engagements during a time period, such as a month) or pacing (e.g., a number of impressions or engagements during a portion of a time period, such as a day).

These content promotions may automatically generate bids based on factors such as past performance (such as a high click-through rate) or a target audience associated with a promotion spot (e.g., Asian males between the ages of 27-35 from the San Francisco area or SUV drivers with incomes above $70,000). (Content promotions can generate bids for promotion spots using, for example, computerized algorithms.) A content promotion may have a relatively high bid for a first promotion spot that includes those factors and may have a relatively low bid for a second promotion spot that does not include those factors. Thus, the content promotion may be more likely to win a market clearing process for the first spot but may be less likely to win the process associated with the second spot, because another content promotion that desires the target audience associated with the second spot will have a higher associated bid.

Since more than one content promotion may bid on each promotion spot based on the factors associated with a particular spot there may not be a single formula that determines whether a particular promotion will "win" a market clearing process. It would be desirable if each bidding content promotion could more accurately determine some relationship between price (i.e., the amount of the bid) and volume (i.e., the number of impressions won). This would enable each bidding content promotion to bid for a promotion spot at an optimal price to win a desired number of impressions. By deriving a more accurate model of the relationship between price and volume, each bidding content promotion is better able to meet or exceed its pacing and/or goal requirements.

SUMMARY

In accordance with the present disclosure, computer-implemented systems and methods are provided for modeling real-world input-output systems. In some embodiments, the modeling may use smooth spline functions. Further, in some embodiments, the real-world input-output systems may correspond to an auction-based advertising system, where content promotions bid on promotion spots on a web page. The highest-bidding promotion for a particular promotion spot may be awarded the impression for that promotion spot.

In accordance with embodiments of the present disclosure, a computer-implemented method is provided for modeling real-world input-output systems. The method may comprise determining at least one price-volume point comprising a price and associated volume, transforming the price, and using the transformed price to calculate values along a spline function to obtain a price-volume curve weight factor. The method may further include transforming a second price, calculating values along the spline function and the first derivative of the spline function using the transformed second price to obtain a volume estimate and volume rate at the second price, and recalculating the spline function based on the calculated price-volume curve weight factor, volume estimate, volume estimate and volume rate.

In accordance with embodiments of the present disclosure, a computer-implemented system is provided that comprises a storage device that stores a set of instructions and one or more processors that execute the set of instructions to perform a method. The method may comprise determining at least one price-volume point comprising a price and associated volume, transforming the price, and using the transformed price to calculate values along a spline function to obtain a price-volume curve weight factor. The method performed by the one or more processors may further include transforming a second price, calculating values along the spline function and the first derivative of the spline function using the transformed second price to obtain a volume estimate and volume rate at the second price, and recalculating the spline function based on the calculated price-volume curve weight factor, volume estimate, volume estimate and volume rate.

In accordance with still further embodiments of the present disclosure, a tangible computer-readable medium is provided that stores a set of instructions executable by one or more processors to cause the one or more processors to perform a method. The method may comprise determining at least one price-volume point comprising a price and associated volume, transforming the price, and using the transformed price to calculate values along a spline function to obtain a price-volume curve weight factor. The method performed by the one or more processors may further include transforming a second price, calculating values along the spline function and the first derivative of the spline function using the transformed second price to obtain a volume estimate and volume rate at the second price, and recalculating the spline function based on the calculated price-volume curve weight factor, volume estimate, volume estimate and volume rate.

In some embodiments, content promotions may be organized into campaigns or groups of promotions. These campaigns (and/or the individual promotions therein) may be configured to only bid on certain types of promotion spots, or may be configured to bid on all promotion spots. For example, one campaign may be configured to bid only for impressions from male users in the San Francisco, Calif. area, while another campaign may be configured to bid for impressions that target 30- to 40-year-old men. This nonidentical but overlapping interest in certain promotions can lead to a discontinuous relationship between impression volume and bid price.

According to certain embodiments, spline functions may be utilized that comprise curves constructed of multiple polynomial function segments. The spline functions can be used to model real-world functions more closely than a single formula that has at most a few variables or parameters. This is because of the conditional and continuous nature of the stitched-together functions. For example, a spline curve could be constructed of multiple segments or "basis functions". Each of these segments on the spline function may be defined for a different portion of the spline function. In some embodiments, these segments are non-overlapping, continuous, and non-decreasing. Furthermore, in some embodiments, the first and second derivatives of these segments are also continuous and non-decreasing.

For example, given the above examples, if the valid values for x are from 0 to 3 (inclusive), then an exemplary spline function could be defined as follows:

$$y = \begin{cases} \frac{1}{6}u^3 & [0,1) \\ -\frac{1}{3}u^3 + \frac{3}{2}u^2 - \frac{3}{2}u + \frac{1}{2} & [1,2) \\ \frac{1}{6}u^3 - \frac{3}{2}u^2 + \frac{9}{2}u - \frac{7}{2} & [2,3] \end{cases}$$

By calculating the above three functions, one can see that the resulting curve creates a continuous, non-overlapping, and non-decreasing spline made up of three separate functions. Spline functions may be useful for approximating a relationship between price and volume in an auction-based advertising system. For example, because a multitude of promotions may bid on the same promotion spot, there may not be a single function that closely approximates the price-volume relationship for any one promotion. Using a spline function composed of more than one function to represent the price-volume relationship can more closely approximate the relationship between a price and an estimated number of impressions.

In some embodiments, as a content promotion's bidding price goes up, the content promotion may be more likely to win an auction process for a promotion spot (i.e., against other promotions that bid less). Thus, in some embodiments, a spline function representing such a price-volume relationship may be non-decreasing.

It is to be understood that both the foregoing general description and the following detailed description are exemplary and explanatory only.

BRIEF DESCRIPTION OF THE DRAWINGS

The accompanying drawings, which are incorporated in and constitute a part of this specification, illustrate several embodiments of the present disclosure and together with the description, serve to explain some principles of the present disclosure.

DETAILED DESCRIPTION OF EXEMPLARY EMBODIMENTS

Reference will now be made in detail to the exemplary embodiments, examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
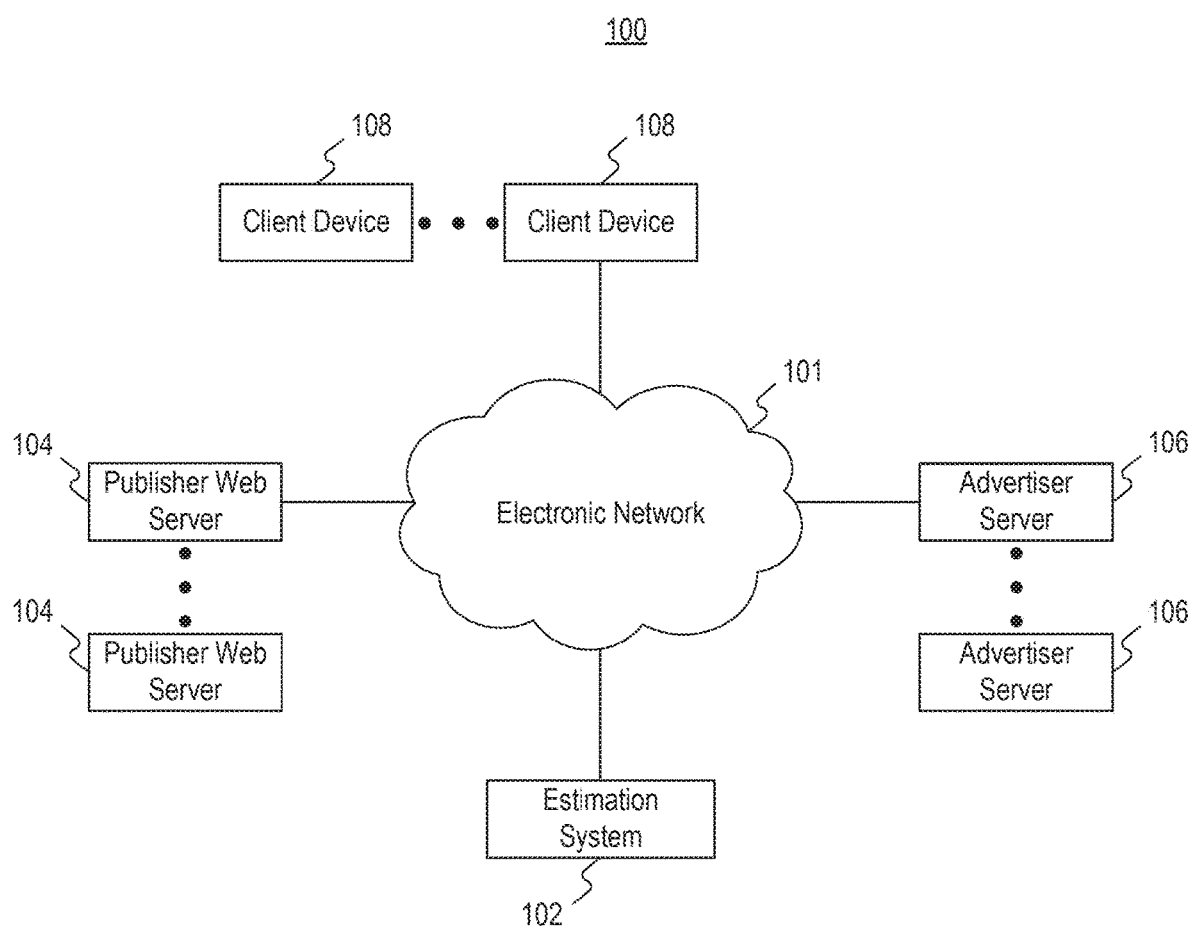
FIG. 1 is a block diagram of an exemplary system environment for implementing embodiments consistent with the present disclosure.
Figure 4:
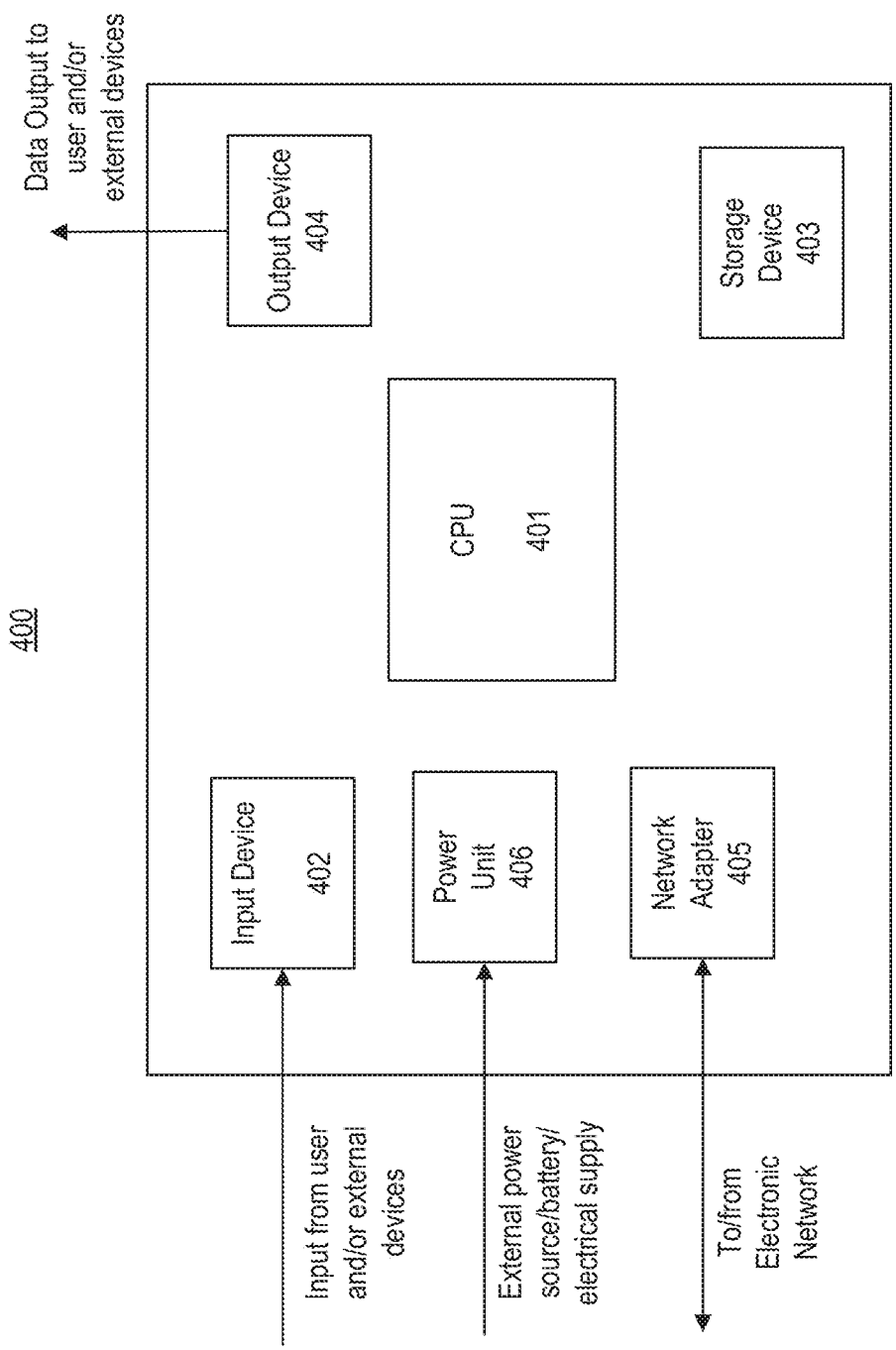
FIG. 4 is a block diagram of an exemplary computer system for implementing embodiments and features consistent with the present disclosure.

FIG. 1 is a block diagram of an exemplary system environment 100 for implementing embodiments consistent with the present disclosure. As shown in FIG. 1, system environment 100 may include one or more of an electronic network 101, an estimation system 102, a publisher web server 104, an advertiser server 106, and a client device 108. As will be appreciated, the number and arrangement of these components may be modified and/or adapted as needed. Each of estimation system 102, publisher web server 104, advertiser server 106, and client device 108 may be implemented as one or more devices, as software implemented on one or more devices, as firmware, as hardware, and/or as any combination thereof. By way of example, FIG. 4 provides a block diagram of an exemplary computer system 400 that may be used to implement one or more of the above-referenced components of FIG. 1.

Referring again to FIG. 1, electronic network 101 may support and provide electronic communication between estimation system 102, publisher web server 104, advertiser server 106, and client device 108. Electronic network 101 may be implemented with any suitable combination of hardware, software, and/or firmware to send and receive data between the components illustrated in FIG. 1. By way of example, electronic network 101 may comprise a local area network ("LAN"), a wireless LAN, e.g., a "WiFi" network, a wireless Metropolitan Area Network ("MAN") that connects multiple wireless LANs, a wide area network ("WAN"), e.g., the Internet, and a dial-up connection (e.g., using a V.90 protocol or a V.92 protocol). Further, the Internet may include any publicly-accessible network or networks interconnected via one or more communication protocols, including, but not limited to, hypertext transfer protocol (HTTP) and transmission control protocol/internet protocol (TCP/IP). Moreover, network 101 may also include one or more mobile device networks, such as a GSM network or a PCS network.

Figure 2:
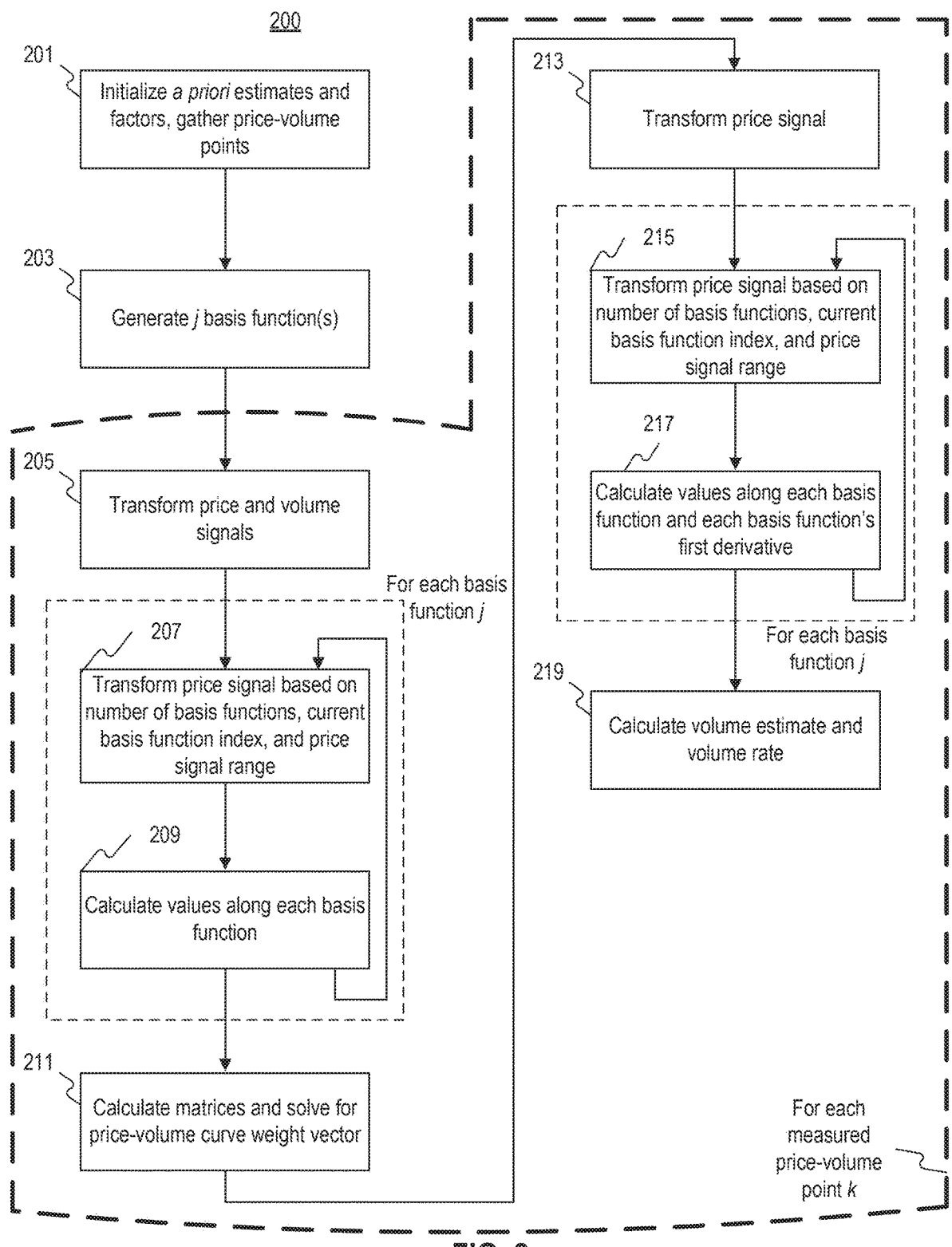
FIG. 2 is a flow chart of an exemplary process for estimating a price-volume relationship for an advertising campaign, consistent with embodiments of the present disclosure.

Estimation system 102 may be implemented as a computer system and/or with one or more processors to perform numerous functions, including, for example, estimating a price-volume relationship for an advertising campaign using a spline function. In some embodiments, estimation system 102 may implement estimator algorithms to determine a price-volume relationship. Content promotions (e.g., advertisements, links to promoted content, videos, or the like) may utilize this price-volume relationship to determine an optimal price to bid for a particular promotion spot. In some embodiments, the optimal price is related to one or more goals associated with the content promotion, such as a pacing or delivery goal. By way of example, FIG. 2 is a flow chart of an exemplary process 200 for estimating a price-volume relationship for an advertising campaign, which is further described below.

Estimation system 102 may also implement algorithms or processes for operating or participating in embodiments of the above-mentioned advertising auction system. For example, estimation system 102 may run or participate in an auction process (also known as a "market clearing process") for choosing a highest-bidding content promotion to insert in a particular promotion spot. Estimation system 102 may also calculate or determine bids for promotion(s) for use in advertising auction systems. In some embodiments, estimation system 102 may be implemented in accordance with the embodiments and features as disclosed in U.S. patent application Ser. No. 13/668,828, entitled "SYSTEMS AND METHODS FOR DISPLAYING DIGITAL CONTENT AND ADVERTISEMENTS OVER ELECTRONIC NETWORKS," invented by Niklas Karlsson, Jianlong Zhang, Robert Alden Luenberger, Scott Robert Strickland, Yih-Shin Cindy Huang, Seyed Mohammad Ziaemohseni, Li Yang, and Hans W. Uhlig, and filed Nov. 5, 2012 (published as U.S. Patent Application Publication No. 2013/0197994), and/or U.S. patent application Ser. No. 12/385,552, entitled "SYSTEMS AND METHODS FOR CONTROLLING BIDDING FOR ONLINE ADVERTISING CAMPAIGNS," invented by Niklas Karlsson and filed Apr. 10, 2009 (published as U.S. Patent Application Publication No. 2010/0262497), each of which is expressly incorporated herein by reference.

Estimation system 102 may also implement algorithms or processes to analyze or explore promotion performance, determine which promotions should be promoted (e.g., based on campaign rules/constraints associated with the promotions), estimate a rate at which promotions should be promoted, determine whether particular promotions should be promoted during a time period, and/or determine the average engagement rate for promotions over a period of time.

Estimation system 102 may communicate with publisher web server 104 to direct publisher web server 104 to display a particular content promotion in a promotion spot on a web page stored on publisher web server 104. Publisher web server(s) 104 may be implemented with one or more computer systems or processors to perform numerous functions, including hosting and delivering content related to web pages or sites. For example, publisher web server 104 may represent or host a news website that uses advertisements for revenue. Web pages may contain, for example, content (such as a news article, image, video, or the like) as well as promotion spots for presenting content promotions. The particular content promotion presented in each promotion spot may be chosen based on, for example, an advertising auction system, as mentioned above. Promotions displayed on or by publisher web server 104 may lead to landing pages on advertiser server 106.

Advertiser server 106, in some embodiments, may be implemented with one or more computer systems or processors. Advertiser server 106 may contain or host landing pages linked to by promotions displayed on or by web pages on publisher web server 104. So, for example, if a user of client device 108 clicks on an advertisement for a software product on a web page hosted or provided by publisher web server 104, the client device 108 may be directed to a web page about the software product that is hosted on or provided by advertiser server 106.

Client device 108 may be implemented with one or more devices, such as computers, laptops, Personal Digital Assistants (PDAs), mobile phones, smart phones, and the like, and any combination of input and output devices (e.g., keyboard, mouse, display, touch sensitive screen, input pen, microphone, speaker, etc.). Client device 108 may enable users to connect to network 101 and access web sites and pages on publisher web server 104 and/or advertiser server 106. For example, client device 108 may be operated by a user to access a web site hosted on or provided by publisher web server 104. Upon seeing an advertisement displayed on the web site, the user may click it, leading to a corresponding landing page hosted on or provided by advertiser server 106.

While the above description for FIG. 1 references web pages and sites, it will be appreciated embodiments consistent with the present disclosure may be adapted to utilize other types of media or data, such as text, email, video, audio, images, and so on.

FIG. 2 is a flow chart of an exemplary process 200 for estimating a price-volume relationship for an advertising campaign, consistent with embodiments of the present disclosure. It will be appreciated that the exemplary process 200 of FIG. 2 may be enhanced, modified, or supplemented.

In some embodiments, process 200 may be implemented using any suitable combination of software, hardware, and/or firmware. By way of example, process 200 may be implemented as software routines or executable instructions through one or more processors or computing devices, such as estimation system 102. Additionally, it will be appreciated that one or more steps of process 200 may be duplicated, substituted, modified, or omitted entirely, without departing from embodiments consistent with this disclosure.

It will be appreciated that in most situations, bids close to a lower bound for bids will not win many (if any) auctions, because there may be one or more other content promotions also bidding on each available promotion spot. Conversely, bids close to an upper bound for bids will win many (if not all) auctions, because there will be few content promotions with higher bids.

As illustrated in FIG. 2, process 200 begins at step 201, where initial a priori estimates and factors are generated. This includes, for example, $u_{low}=0$, $u_{high}=1$ (representing lower and upper bounds for price controls, respectively), n=50 (representing the number of basis functions used in estimating the price-volume relationship), $$\Delta = \frac{u_{high} - u_{low}}{n-3}$$

(representing the spacing between each consecutive two knots in the spline), a matrix $\Omega$:

$$\Omega = \frac{1}{\Delta^3} \begin{bmatrix} 1/3 & -1/6 & -1/6 & \cdots & 0 & 0 & 0 \\ -1/6 & 2/3 & -1/3 & \ddots & 0 & 0 & 0 \\ -1/6 & -1/3 & 1 & \ddots & 0 & 0 & 0 \\ 0 & -1/6 & -1/3 & \ddots & 0 & 0 & 0 \\ \vdots & & & \ddots & & & \vdots \\ 0 & 0 & 0 & \ddots & 1 & -1/3 & -1/6 \\ 0 & 0 & 0 & \ddots & -1/3 & 2/3 & -1/6 \\ 0 & 0 & 0 & \ddots & -1/6 & -1/6 & 1/3 \end{bmatrix},$$

$\xi_{1hr}=0.99$ (representing a forgetting factor, e.g., for weighting more recent measurements more than older measurements), $\lambda=0.000001$ (representing a smoothness factor), $G_0=\lambda\Omega$, and $g_0=0$ (representing matrices used in calculating a price-volume curve weight vector), and $\tau_j=u_{low}+(j-3)\Delta$ (representing a factor for basis function index j, where j=1, . . . , n).

Estimation system 102, at step 201, may also determine the number of impressions "won" by each content promotion at a particular price. These price-volume points may be obtained from, for example, a data store or database in communication with estimation system 102, or from results obtained by estimation system 102 operating an auction process. Each time that a content promotion bids on a particular promotion spot using a bid (the "price") u, estimation system 102 measures the number of impressions that the content promotion wins at that price (the "volume"). From this, estimation system 102 can derive a set of points correlating price and volume. The number of measured price-volume points is represented by the variable k.

Process 200 may then proceed to step 203, where estimation system 102 may generate n basis functions for use in estimating the price-volume curve. As will be appreciated, the use of more basis functions enables a better estimate of this curve, because it enables a finer amount of adjustment to be made.

In step 205, estimation system 102 may begin a set of steps that operates once on each price-volume point. For example, each of steps 205-219 may operate once for each set of points. In some embodiments, each operation of these steps may be performed in parallel (e.g., a system performing steps 205-219 on a first price-volume coordinate and a second price-volume coordinate simultaneously), in sequence (e.g., a system performing steps 205-219 on a first price-volume coordinate, then a system performing steps 205-219 on a second price-volume coordinate, etc.), or upon gathering each distinct price-volume coordinate.

In step 205, estimation system 102 may transform price and volume signals. For example, inputted price signal $v_k$ (e.g., a bid at time k) may be transformed using a Box-Cox-like transformation: $u_k=v_k^c$, where c represents a factor used in stabilizing variance of the price control and is equal to, for example, 0.5. Additionally, an inputted volume signal $y_k$ at time k (e.g., a number of impressions resulting from inputted price signal $v_k$) may be transformed as $y_k=\ln(n_{i,k}+1)$.

In step 207, estimation system 102 may begin a set of steps that operates once on each basis function $N_j$. This involves, for example, transforming the transformed price signal $u_k$ using the number of basis functions, the index number corresponding to a current basis function, and a range of price signals. For example, estimation system 102 may calculate this twice-transformed price signal as $$\tilde{u} = \frac{u_k - \tau_j}{\Delta}.$$

(As mentioned above, in some embodiments, $$\Delta = \frac{u_{high} - u_{low}}{n-3}$$

and $\tau_j=u_{low}+(j-3)\Delta$.)

In step 209, estimation system 102 may calculate values along each basis function using the twice-transformed price signal $\tilde{u}$—for example, as $$N_j(u_k) = \begin{cases} 0 & \text{if } \tilde{u} < 0 \\ \frac{1}{6}\tilde{u}^3 & \text{if } 0 \le \tilde{u} < 1 \\ -\frac{1}{3}\tilde{u}^3 + \frac{3}{2}\tilde{u}^2 - \frac{3}{2}\tilde{u} + \frac{1}{2} & \text{if } 1 \le \tilde{u} < 2 \\ \frac{1}{6}\tilde{u}^3 - \frac{3}{2}\tilde{u}^2 + \frac{9}{2}\tilde{u} - \frac{7}{2} & \text{if } 2 \le \tilde{u} < 3 \\ 1 & \text{if } \tilde{u} \ge 3 \end{cases}.$$

Steps 207 and 209 may be repeated by estimation system 102 for each basis function $N_j$, where j=1, . . . , n After the last basis function $N_n$ has been calculated in step 209, process 200 may proceed to step 211, where estimation system 102 may generate a matrix of these calculated basis functions $N(u_k)$, equal to $[N_1(u_k), N_2(u_k), \ldots, N_n(u_k)]$, and forgetting factor $\xi=\xi_{1hr}^{\delta_k}$, where $\delta_k$ represents the amount of time elapsed since the immediately previous measurement. Estimation system 102 may then recursively calculate matrices $G_k$ and $g_k$ as:

$$G_k=\xi G_{k-1}+N(u_k)^T N(u_k)+\lambda(1-\xi)\Omega, \text{ and}$$

$$g_k=\xi g_{k-1}-N(u_k)^T y_k.$$

From these, estimation system 102 may calculate a "price-volume curve weight vector" $\hat{\theta}_k$, where $\hat{\theta}_k$ is equal to, for example, $$\arg\min_{\theta \geq 0} \frac{1}{2}\theta^T \mathbb{G}_k \theta + g_k^T \theta \cdot \hat{\theta}_k$$

may be calculated using one or more algorithms for constrained quadratic optimization. Examples of some constrained quadratic optimization algorithms, such as Interior Point Methods, are referenced in "Convex Optimization" by Boyd and Vandenberghe (Cambridge University Press, 2004). It will be appreciated from this disclosure that variations and other algorithms are possible as well.

After calculating the price-volume curve weight vector $\hat{\theta}_k$ in step 211, process 200 may continue to step 213, where estimation system 102 may begin a sub-process of estimating a response to a particular price input. For example, estimation system 102 may determine a volume estimate $\hat{n}_I(\acute{v})$ for a price input $\acute{v}$ that may be different from a previous price input $v_k$, along with a corresponding volume rate $$\left.\frac{\partial \hat{n}_I(v)}{\partial v}\right]_{v=\acute{v}},$$

based on the price-volume curve weight vector $\hat{\theta}_k$. $\acute{v}$ may be the same as one or more earlier price points $v_k$ for which a corresponding volume was observed or may be a different price point for which a volume estimate has not been observed. In step 213, estimation system may transform price signal $\acute{v}$ as $\acute{v}=\acute{v}^c$, where c represents a factor used in stabilizing variance of the price control $\acute{v}$ and is equal to, for example, 0.5.

In steps 215-217, estimation system 102 may begin a set of steps that operates once on each basis function $N_j$. This involves, for example, transforming the transformed price signal $\acute{u}$ using the number of basis functions (n), the index number corresponding to the current basis function, and a range of price signals. For example, estimation system 102 may calculate this twice-transformed price signal as $$\tilde{u} = \frac{\acute{u} - \tau_j}{\Delta}.$$

(Note that, as mentioned above, $$\Delta = \frac{u_{high} - u_{low}}{n-3}$$

and $\tau_j = u_{low} + (j-3)\Delta$.)

In step 217, estimation system 102 may calculate values along each basis function j using the twice-transformed price signal $\tilde{u}$. For example, the values for each basis function may be calculated as:

$$N_j(u_k) = \begin{cases} 0 & \text{if } \tilde{u} < 0 \\ \frac{1}{6}\tilde{u}^3 & \text{if } 0 \leq \tilde{u} < 1 \\ -\frac{1}{3}\tilde{u}^3 + \frac{3}{2}\tilde{u}^2 - \frac{3}{2}\tilde{u} + \frac{1}{2} & \text{if } 1 \leq \tilde{u} < 2 \\ \frac{1}{6}\tilde{u}^3 - \frac{3}{2}\tilde{u}^2 + \frac{9}{2}\tilde{u} - \frac{7}{2} & \text{if } 2 \leq \tilde{u} < 3 \\ 1 & \text{if } \tilde{u} \geq 3 \end{cases}.$$

Estimation system 102 may also calculate values along the first derivative of each basis function—for example, as $$N_j'(u_k) = \begin{cases} 0 & \text{if } \tilde{u} < 0 \\ \frac{1}{2}\tilde{u}^2 & \text{if } 0 \leq \tilde{u} < 1 \\ -\tilde{u}^2 + 3\tilde{u} - \frac{3}{2} & \text{if } 1 \leq \tilde{u} < 2 \\ \frac{1}{2}\tilde{u}^2 - 3\tilde{u} + \frac{9}{2} & \text{if } 2 \leq \tilde{u} < 3 \\ 0 & \text{if } \tilde{u} \geq 3 \end{cases}$$

Steps 215 and 217 may be repeated by estimation system 102 for each basis function j. After the last basis function $N_j$ and its first derivative $N_j'$ have been calculated, process 200 may proceed to step 219, where estimation system 102 may calculate a matrix of these calculated basis functions $N(\acute{u}) = [N_1(\acute{u}), N_2(\acute{u}), \ldots, N_n(\acute{u})]$ and a matrix of their first derivatives $N'(\acute{u}) = [N_1(\acute{u}), N_2(\acute{u}), \ldots, N_n(\acute{u})]$. Estimation system 102 may then calculate a matrix $\hat{y}$ using the matrix of calculated basis functions and the price-volume curve weight vector $\hat{\theta}_k$, as $\hat{y} = N(\acute{u})\hat{\theta}_k$, the first derivative of that matrix $$\left.\frac{\partial \hat{y}}{\partial u}\right]_{u=\acute{u}} = N'(\acute{u})\hat{\theta}_k,$$

a volume estimate at price $\acute{v}$, $\hat{n}_I(\acute{v}) = \exp(N(\acute{u})\hat{\theta}_k) - 1$, and a volume rate at price $$\acute{v}\left(\left.\frac{\partial \hat{n}_I(v)}{\partial v}\right]_{v=\acute{v}}\right),$$

equal to $N'(\acute{v}^c)\hat{\theta}_k \exp(N(\acute{v}^c)\hat{\theta}_k)\acute{v}^{c-1}c$.

Figure 3:
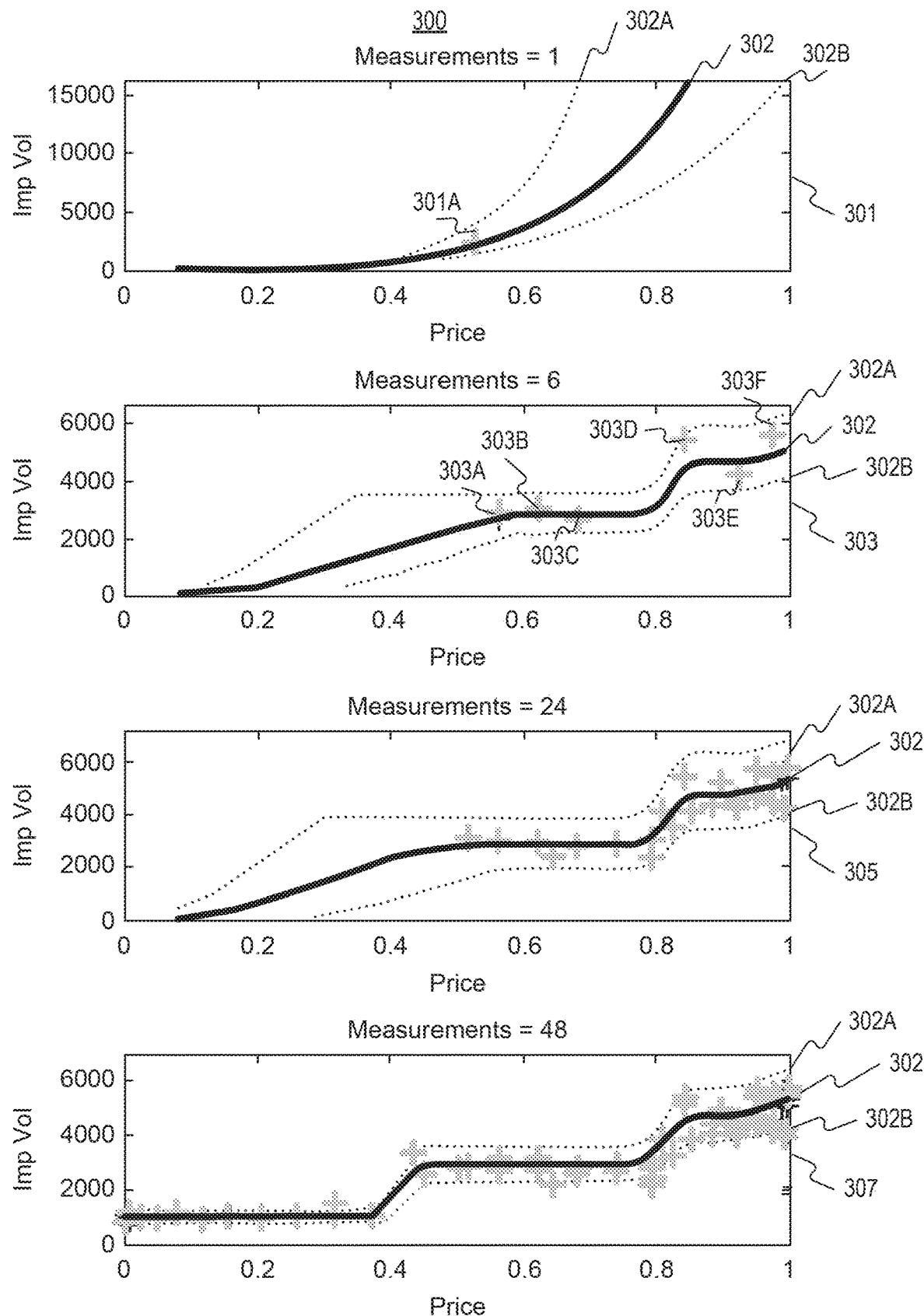
FIG. 3 illustrates sample price-volume graphs for a content promotion, consistent with embodiments of the present disclosure.

FIG. 3 illustrates exemplary price-volume graphs for a content promotion, consistent with embodiments of the present disclosure. FIG. 3 comprises graphs 301, 303, 305, and 307, each of which comprises line 302. Line 302 represents a spline function based on one or more price-volume measurements associated with a content promotion. Each price-volume measurement on each of graphs 301, 303, 305, and 307 (shown as gray crosses), represents a number of impressions awarded to a content promotion (shown on the Y-axis) based on the bid price associated with that content promotion (shown on the X-axis). For example, graph 301 contains a single price-volume measurement 301A corresponding to a number of impressions won by a content promotion at a particular price. Line 302, representing a spline function for that content promotion, is based on price-volume measurement 301A. Line 302 is bounded by dotted lines 302A and 302B which correspond to upper and lower confidence bounds for line 302, respectively. As the relationship represented by line 302 is based on measuring the number of impressions related to each bid price, more impressions yield a higher confidence in that relationship. The actual relationship between bid price and impressions may fall in between lines 302A and 302B. In graph 301, dotted lines 302A and 302B are somewhat far away from line 302 because the confidence in the relationship is not high.

Example graph 303 represents the spline function after five more price-volume measurements are made. Graph 303 includes six separate price-volume measurements 303A-303F, each of which represent a different price and a corresponding number of awarded impressions. Line 302 has been modified from graph 301 to graph 303 because each time a price-volume measurement is received the spline function corresponding to line 302 may be recalculated to account for the received measurements. In graph 303, dotted lines 302A and 302B are somewhat closer than in graph 301, because the confidence in the relationship is somewhat higher.

Graphs 305 and 307 contain 24 and 48 price-volume measurements, respectively. Line 302 differs between each of graphs 305 and 307 because each of those graphs depict the spline function after having received a different number of price-volume measurements. Note that in graph 305, dotted lines 302A and 302B are closer to line 302 than in graphs 301 or 303, representing a higher confidence in the relationship represented by line 302, and that in graph 307, dotted lines 302A and 302B are closer still.

FIG. 4 is a block diagram of an exemplary computer system 400 for implementing embodiments consistent with the present disclosure. Exemplary computer system 400, including variations thereof, may be used for implementing estimation system 102, publisher web server 104, advertiser server 106, and/or client device 108.

As shown in FIG. 4, exemplary computer system 400 may include one or more central processing unit 401 for managing and processing data, as well as performing operations consistent with the present disclosure. Computer system 400 may also include one or more memory or storage device 403. Storage device 403 may comprise optical, magnetic, signal, and/or any other type of storage device. Computer system 400 may also include one or more network adapter 405. Network adapter 405 may allow computer system 400 to connect to electronic networks, such as the Internet, a local area network, a wide area network, a cellular network, a wireless network, and/or any other type of network. Computer system 400 may also include one or more power unit 406, which may enable computer system 400 and its components to receive power and fully operate.

In some embodiments, computer system 400 may also include one or more input devices 402, which receive input from users and/or modules or devices. Input device 402 may include, but are not limited to, keyboards, mice, trackballs, trackpads, scanners, cameras, and other input devices, including those which connect via Universal Serial Bus (USB), serial, parallel, infrared, wireless, wired, or other connections. Computer system 400 may also include one or more output devices 404, which transmit data to users and/or modules or devices. Such modules or devices may include, but are not limited to, computer monitors, televisions, screens, projectors, printers, plotters, and other recording/displaying devices which may connect via wired or wireless connections.

The components in FIG. 4 may be connected to one another through an electrical communication system, such as an internal bus (not shown in FIG. 4). Other electrical communication pathways/connectors may also be provided to support data communication and power between these components.

Other embodiments and features will be apparent from consideration of the specification and practice of the embodiments and features disclosed herein. It is intended that the specification and examples be considered as exemplary only.

What is claimed is:

1. A computer-implemented method of estimating response curves associated with the distribution of graphical data elements on an electronic network, the method comprising the following operations performed by one or more processors:
    determining at least one input-output point, comprising an input value and a corresponding output value, the input value and corresponding output value corresponding to the distribution of graphical data elements on the electronic network;
    transforming the input value of the at least one input-output point based on a range of input values;
    determining, based on the transformed at least one input value, values along a response curve to obtain a curve weight factor;
    transforming a second input value based on the range of valid input values;
    determining, based on the second transformed input value, values along the response curve and the first derivative of the response curve, to obtain an estimated output value and estimated output rate associated with the second input value; and
    redetermining the response curve based on the determined curve weight factor, estimated output value, and estimated output rate.

2. The method of claim 1, wherein the input value corresponds to an exchange bid and the output value corresponds to a volume associated with the exchange bid.

3. The method of claim 2, wherein the volume associated with the exchange bid represents a number of placements of graphical data elements on a network that placed the exchange bid at an exchange associated with the distribution of graphical data elements on the electronic network.

4. The method of claim 3, wherein the exchange associated with the distribution of graphical data elements on the electronic network comprises:
    receiving one or more exchange bids associated with one or more graphical data elements;
    determining the highest received exchange bid; and
    determining impression placements for graphical data elements associated with the highest exchange bid.

5. The method of claim 3, further comprising:
    determining one of a pacing or a delivery goal associated with distribution of the graphical data elements on the electronic network;
    determining a number of impressions needed to satisfy the determined goal; and
    determining, using the response curve, at least one exchange bid associated with the determined number of impressions.

6. The method of claim 1, wherein the response curve is non-decreasing and is constructed of more than one polynomial function.

7. The method of claim 1, wherein transforming an input value further comprises raising the input value to the power of a factor and determining the logarithm of an associated output value.

8. A non-transitory computer-readable storage medium containing instructions for estimating response curves associated with the distribution of graphical data elements on an electronic network that, when executed by at least one electronic processor, causes the at least one electronic processor to perform the following operations:
    determining at least one input-output point, comprising an input value and a corresponding output value, the input value and corresponding output value corresponding to the distribution of graphical data elements on the electronic network;

transforming the input value of the at least one input-output point based on a range of input values;

determining, based on the transformed at least one input value, values along a response curve to obtain a curve weight factor;

transforming a second input value based on the range of valid input values;

determining, based on the second transformed input value, values along the response curve and the first derivative of the response curve, to obtain an estimated output value and estimated output rate associated with the second input value; and redetermining the response curve based on the determined curve weight factor, estimated output value, and estimated output rate.

9. The computer-readable medium of claim 8, wherein the input value corresponds to an exchange bid and the output value corresponds to a volume associated with the exchange bid.

10. The computer-readable medium of claim 9, wherein the volume associated with the exchange bid represents a number of placements of graphical data elements on a network that placed the exchange bid at an exchange associated with the distribution of graphical data elements on the electronic network.

11. The computer-readable medium of claim 10, wherein the exchange associated with the distribution of graphical data elements on the electronic network comprises:

receiving one or more exchange bids associated with one or more graphical data elements;

determining the highest received exchange bid; and determining impression placements for graphical data elements associated with the highest exchange bid.

12. The computer-readable medium of claim 10, further comprising:

determining one of a pacing or a delivery goal associated with distribution of the graphical data elements on the electronic network;

determining a number of impressions needed to satisfy the determined goal; and determining, using the response curve, at least one exchange bid associated with the determined number of impressions.

13. The computer-readable medium of claim 8, wherein the response curve is non-decreasing and is constructed of more than one polynomial function.

14. The computer-readable medium of claim 8, wherein transforming an input value further comprises raising the input value to the power of a factor and determining the logarithm of an associated output value.

15. A system for estimating response curves, comprising:

at least one electronic processor; and a storage device that stores instructions that, when executed by the at least one electronic processor, causes the at least one electronic processor to perform a method for estimating response curves associated with the distribution of graphical data elements on an electronic network comprising:

determining at least one input-output point, comprising an input value and a corresponding output value, the input value and corresponding output value corresponding to the distribution of graphical data elements on the electronic network;

transforming the input value of the at least one input-output point based on a range of input values;

determining, based on the transformed at least one input value, values along a response curve to obtain a curve weight factor;

transforming a second input value based on the range of valid input values;

determining, based on the second transformed input value, values along the response curve and the first derivative of the response curve, to obtain an estimated output value and estimated output rate associated with the second input value; and redetermining the response curve based on the determined curve weight factor, estimated output value, and estimated output rate.

16. The system of claim 15, wherein the input value corresponds to an exchange bid and the output value corresponds to a volume associated with the exchange bid.

17. The system of claim 15, wherein the volume associated with the exchange bid represents a number of placements of graphical data elements on a network that placed the exchange bid at an exchange associated with the distribution of graphical data elements on the electronic network.

18. The system of claim 15, wherein the exchange associated with the distribution of graphical data elements on the electronic network comprises:

receiving one or more exchange bids associated with one or more graphical data elements;

determining the highest received exchange bid; and determining impression placements for graphical data elements associated with the highest exchange bid.

19. The system of claim 15, wherein the response curve is non-decreasing and is constructed of more than one polynomial function.

20. The system of claim 15, wherein transforming an input value further comprises raising the input value to the power of a factor and determining the logarithm of an associated output value.

* * * * *